United States Patent [19]
Kraul et al.

[11] Patent Number: 5,648,990
[45] Date of Patent: Jul. 15, 1997

[54] RADIO ACCESSORY FOR COMMUNICATING WITH A PROGRAMMABLE COMPUTING DEVICE AND METHOD THEREFOR

[75] Inventors: Douglas R. Kraul, Parkland; Michael J. DeLuca, Boca Raton; Bryant Wilder, Boynton Beach, all of Fla.

[73] Assignee: Motorola, Inc., Schaumburg, Ill.

[21] Appl. No.: 432,349

[22] Filed: May 1, 1995

[51] Int. Cl.$^6$ ............................................. H04B 7/00
[52] U.S. Cl. .......................... 375/316; 375/220; 455/349
[58] Field of Search .................................. 375/220, 222, 375/316; 379/57; 395/700; 340/825.44; 455/142, 61, 347, 348, 349

[56] References Cited

U.S. PATENT DOCUMENTS

| | | | |
|---|---|---|---|
| 4,644,351 | 2/1987 | Zabarsky et al. | 340/825.44 |
| 5,043,721 | 8/1991 | May | 340/825.44 |
| 5,412,798 | 5/1995 | Garney | 395/500 |

FOREIGN PATENT DOCUMENTS

60-204133  10/1985  Japan.

*Primary Examiner*—Stephen Chin
*Assistant Examiner*—Kevin Kim
*Attorney, Agent, or Firm*—Philip P. Macnak; John H. Moore

[57] ABSTRACT

A radio accessory (20) for a personal computing device (50) has a receiver (30) and an interface circuit (32) for receiving and digitizing paging signals modulated on a radio frequency carrier. The paging signals are encoded in accordance with a predetermined protocol such as POCSAG. The personal computing device (50) then decodes the digitized paging signals in accordance with software instructions provided either by the instruction memory (40) in the accessory (20) or on a disk (84). The accessory (20) also has an identification code which validates software from the disk (84) to deter unauthorized use of the accessory (20). The accessory (20) also has a transmitter (28) for sending wireless information.

5 Claims, 7 Drawing Sheets

RADIO ACCESSORY FOR COMMUNICATING WITH A PROGRAMMABLE COMPUTING DEVICE AND METHOD THEREFOR

FIELD OF THE INVENTION

This invention generally relates to the field of radio frequency receivers and more particularly to information receivers coupled to and communicating with programmable computing devices.

BACKGROUND

As the acceptance of pagers and paging systems grow, the amount of useful information transmitted by paging systems also grows. Such information includes stock quotes, sports scores and news items. This kind of information is often time critical. That is, its value is only relevant at about the time it is transmitted by the paging system. For example, an intermediate score of an ongoing basketball game becomes obsolete very rapidly as the score changes. If the information is not read within a short time of its transmission, its value diminishes. Consequently, there is little reason to receive or store the information if a user of the information is not close at hand. Thus, it is desirable to develop a paging receiver capable of capitalizing on this phenomena.

Furthermore, this type information may be of interest to a large number of users within range of the paging system. Consequently, it is desirable to provide a very low cost device for of receiving and displaying the information so the large number of users could afford the capability of receiving this information. With the growing popularity of programmable personal computing devices such as the IBM PC and its clones or the Apple Macintosh, and their corresponding increase in computing power, programmable memory and information display facilities, it is desirable to use as much of the facility of such personal computers as possible to reduce the cost of an accessory for receiving, decoding and displaying this type of paging information.

Thus, what is needed is a very low cost accessory for a personal computer capable of receiving paging information.

DETAILED DESCRIPTION OF THE INVENTION

Figure 1:
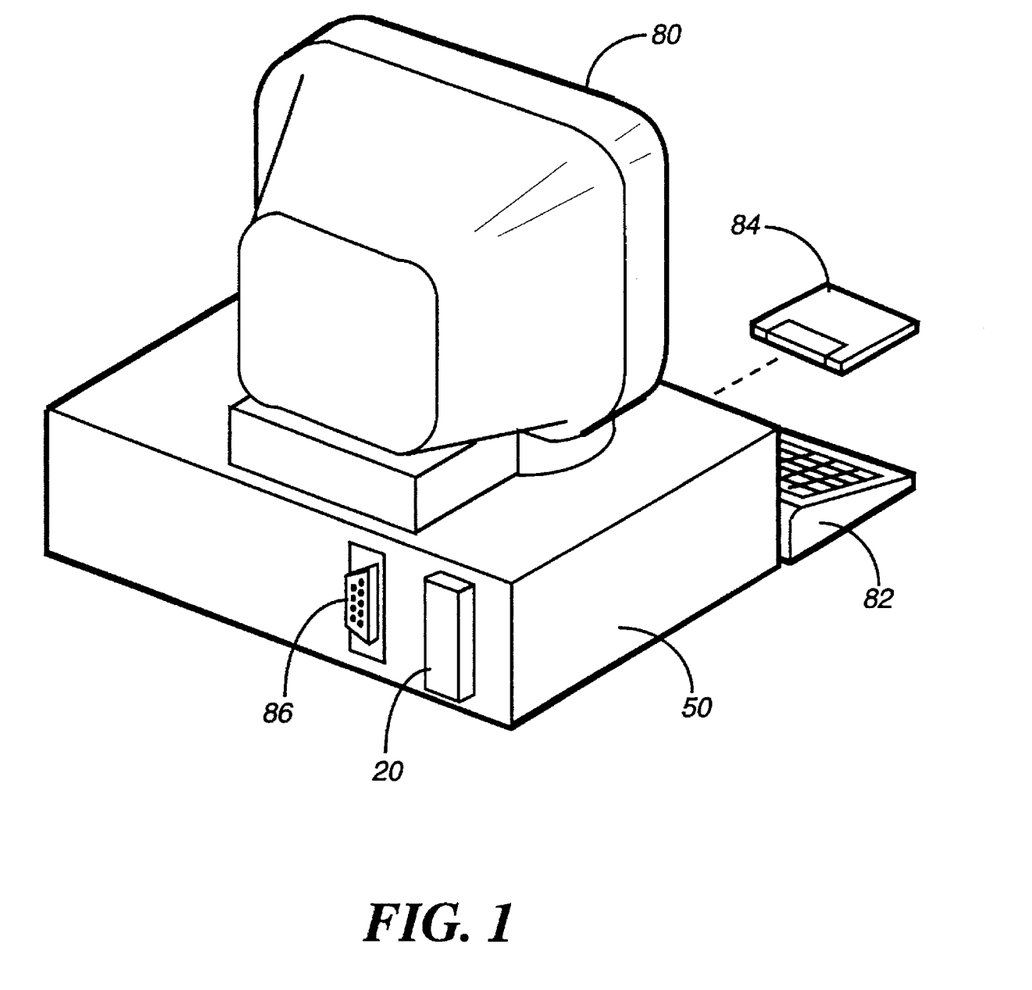
FIG. 1 shows a perspective view of a preferred embodiment of the present invention.

FIG. 1 shows a perspective view of a preferred embodiment of the present invention. An accessory 20 is attached to a digital computing device or personal computer (PC) 50 which has a display 80 and keyboard 82. The PC 50 may be one of a variety of personal computers manufactured by IBM, Apple or others. Although the present invention describes the use of a desktop PC, it will be appreciated that other computers including mainframe, mobile, portable, laptop, palmtop, Personal Information Managers (PIMs) and Personal Digital Assistants (PDAs) can be utilized as well. The accessory 20 receives and transmits wireless information to and from the PC 50. A disk memory 84, when included, contains instructions and codes for operating the accessory 20. Also shown, is a connector 86, such as an RS-232 type connector, which is part of the PC 50. There is a similar connector (not shown) which is used to, both electrically and mechanically, removably attach the accessory 20 to the PC 50. The connector 86 rigidly secures the accessory 20 to the PC 50 to form a supporting means, wherein the supporting means is substantially the only means for securing the accessory to the digital computing device. This provides for convenient installation of the accessory 20 and minimizes the amount of space on a desk in which the accessory 20 / PC 50 system occupies.

Figure 2:
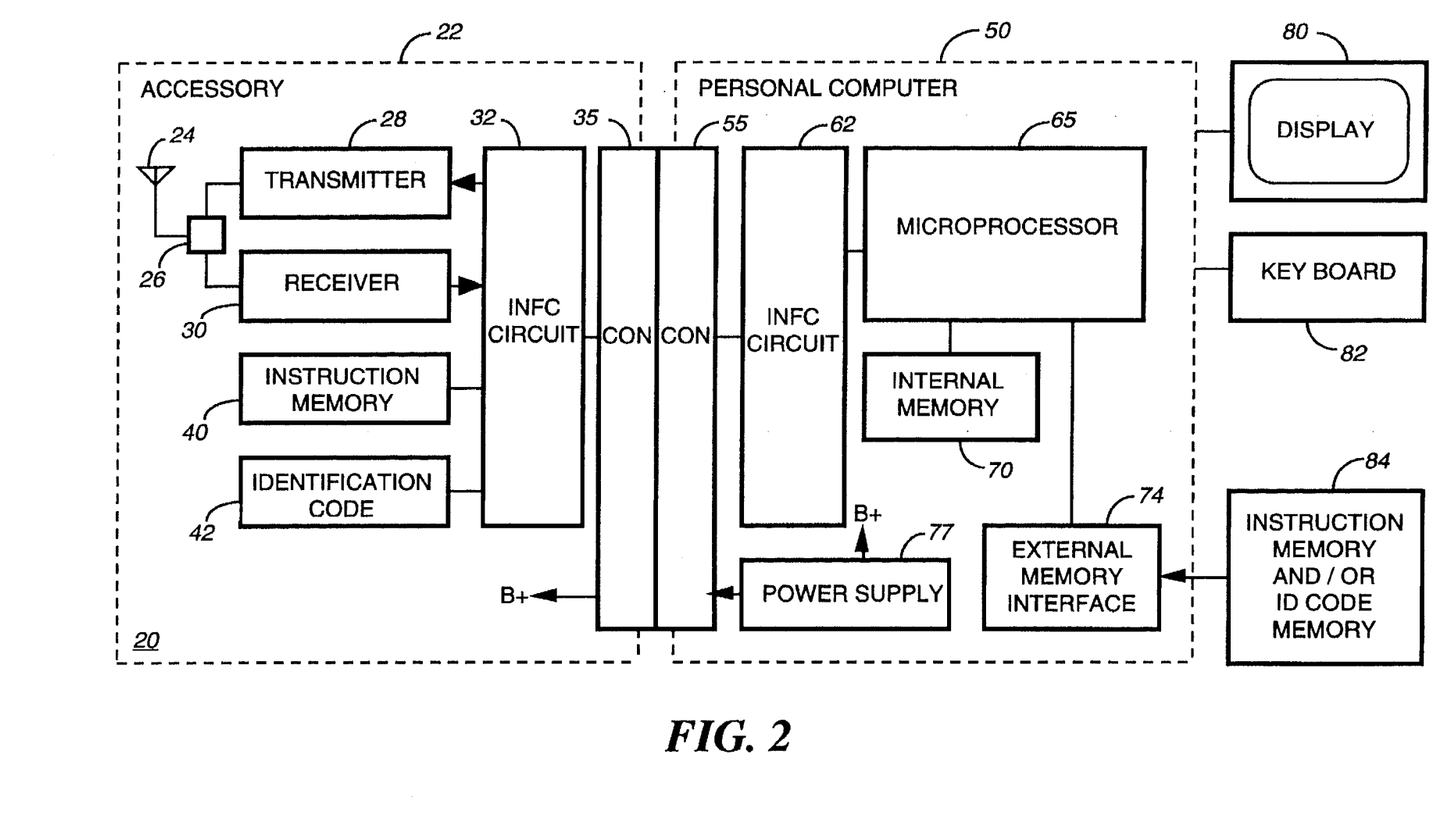
FIG. 2 shows an electrical block diagram of the invention of FIG. 1.

FIG. 2 shows an electrical block diagram of the invention of FIG. 1. The accessory 20 comprises a housing 22 which buses an antenna 24 for making a radio frequency interface through an antenna switch 26 to either a transmitter 28 or a receiver 30. The antenna switch 26 couples the antenna 24 to the receiver 30 during reception and decouples the antenna 24 from the receiver 30 and couples the antenna 24 to the transmitter 28 during transmission. In an alternate embodiment, the receiver 30 and the transmitter 28 can have independent antennas, thereby eliminating the need for the antenna switch 26. The receiver 30 is a heterodyne receiver which produces an audio signal having a DC carrier offset and information AC modulated thereon. The audio signal is processed by the interface circuit 32. Alternately, the receiver 30 can be a direct conversion receiver having a zero intermediate frequency or another type of receiver well know to one of ordinary skill in the art. The interface circuit 32 includes a digitizer for converting the signal from the receiver 30 into a digital form. The interface circuit 32 also includes circuitry for digitally interfacing with the PC 50 through the connector 35, which includes a Universal Asynchronous Receive and Transmit (UART) circuit for supporting a serial RS-232C interface. The interface circuit 32 further receives information for transmission from the PC 50 and converts the information into a form necessary for transmission by the transmitter 28. The interface circuit 32 also enables the PC 50 to interface with an instruction memory 40 and an identification code memory 42 which permanently stores an identification code which uniquely identifies the accessory 20.

The PC 50 includes a connector 55 for both electrically and mechanically coupling with the accessory 20. The connector 55 can correspond to an RS-232C connector similar to connector 86, while connector 35 is adapted to interface correspondingly with the connector 55. The interface logic 62 provides interfacing with a microprocessor 65 and includes a UART corresponding to the UART in the interface circuit 32. Although the present invention describes a serial asynchronous interface, it will be appreciated that alternate interfaces such as synchronous serial interfaces, parallel interfaces such as a PCMCIA interface or other similar interfaces can be utilized as well. The microprocessor 65 runs instructions and processes data stored in memory including from an internal memory 70. Instructions or data can originate from the internal instruction memory 40 or from the external disk memory 84 as communicated through the external memory interface 74. The PC 50 also includes a power supply 77 for providing operating power to the components of the PC 50. In the preferred embodiment of the present invention, the power supply 77 also provides operating power to the components of the accessory 20 through the connector 35 and the connector 55, thereby eliminating the need for a power source internal to the accessory 20.

In summary, the accessory 20 is a receiver which is removably attached to the PC 50 for receiving, demodulating and digitizing radio frequency modulated symbols organized in accordance with a predetermined signaling protocol for communicating message information to the accessory 20. The accessory 20 communicates the digitized symbols to the PC 50. The accessory 20 further includes a memory means, such as an instruction memory 40 or a rotatable magnetic storage means, or disk memory 84, which is removably connected to the PC 50 for receiving instructions for decoding the digitized symbols in accordance with the predetermined signaling protocol.

The accessory 20 further uses the computing power of the PC 50 to simplify the internal circuitry of the accessory 20, thereby reducing the cost of the accessory 20 and further adding to its flexibility. In a preferred embodiment of the present invention, the accessory 20 and the PC 50 form a means for receiving, decoding and displaying wireless messages transmitted on a predetermined signaling protocol encoded paging radio frequency (RF) channel. One such predetermined protocol has been defined by the Post Office Code Advisory Group (POCSAG) and is commonly used in paging messaging. In order to accomplish the ends of receiving, decoding and displaying wireless messages transmitted using the POCSAG signaling protocol, the following basic tasks are performed:

1. RF reception and demodulation, producing a recovered audio signal
2. Carrier or DC voltage offset extraction
3. Digitization of the demodulated signal
4. Bit Synchronization
5. Frame and Batch Synchronization
6. Message Selection by address decoding
7. Message processing and storage
8. Message presentation The steps above are well known to one of ordinary skill in the paging art within a typical portable pager. The typical portable pager, such as the Motorola Advisor™ alphanumeric pager, provides a means for performing all eight tasks. More recent pagers which interface with PCs may perform all eight tasks, or may perform only tasks one through seven, leaving the eighth task of displaying messages to the PC. Further, the PC may perform a portion of task seven by providing additional message processing and storage. Such an embodiment is implemented by Motorola's NewsCard™ PCMCIA accessory which receives, processes and stores POCSAG messages, including E-mail and other information services, for later storage and display by a PC executing provided software instructions.

Unlike the typical portable pagers described above, the present invention has the advantage of partitioning the performance of tasks five through eight to the PC's microcomputer and software while the accessory performs a minimum number of tasks. Three embodiments of the accessory 20 in accordance with the present invention are described below. In the first embodiment, the accessory 20 performs tasks one, two and three. In the second embodiment, the accessory 20 performs tasks one and three, and in the third embodiment, the accessory 20 performs tasks one, two, three and four. Tasks not performed by the accessory 20 are performed by the PC 50 and its software instruction set. This partitioning of the tasks not only has the advantage of substantially reducing the cost of the accessory 20 by taking advantage of the significant computing power of the PC 50, but also has the advantage of significantly increasing flexibility of the accessory 20 / PC 50 system. By placing many of the tasks in software executed in the PC 50, the tasks may be modified simply with a PC software upgrade. For example, unless specifically designed and manufactured with the capability, it was impossible to upgrade the prior art pagers from 512 to 1200 bit per second (bps) POCSAG. This was due in part because the bit synchronization function was performed in hardware or firmware. However, in the first two embodiments of the present invention, the bit rate can be changed with a PC software upgrade which processes the digitized signal at the new bit rate. Furthermore, the second embodiment of the accessory 20 will allow for a software upgrade from POCSAG to a different signaling protocol, such as Motorola's new 6400 bit per second Flex™ paging protocol. Such flexibility provides an unprecedented advantage to both the provider and consumer of paging hardware and services. Improved flexibility due to software upgrades is also realized by other changes which can improve the quality of the messages received or the method by which the received information may be used, stored or displayed.

Figure 3:
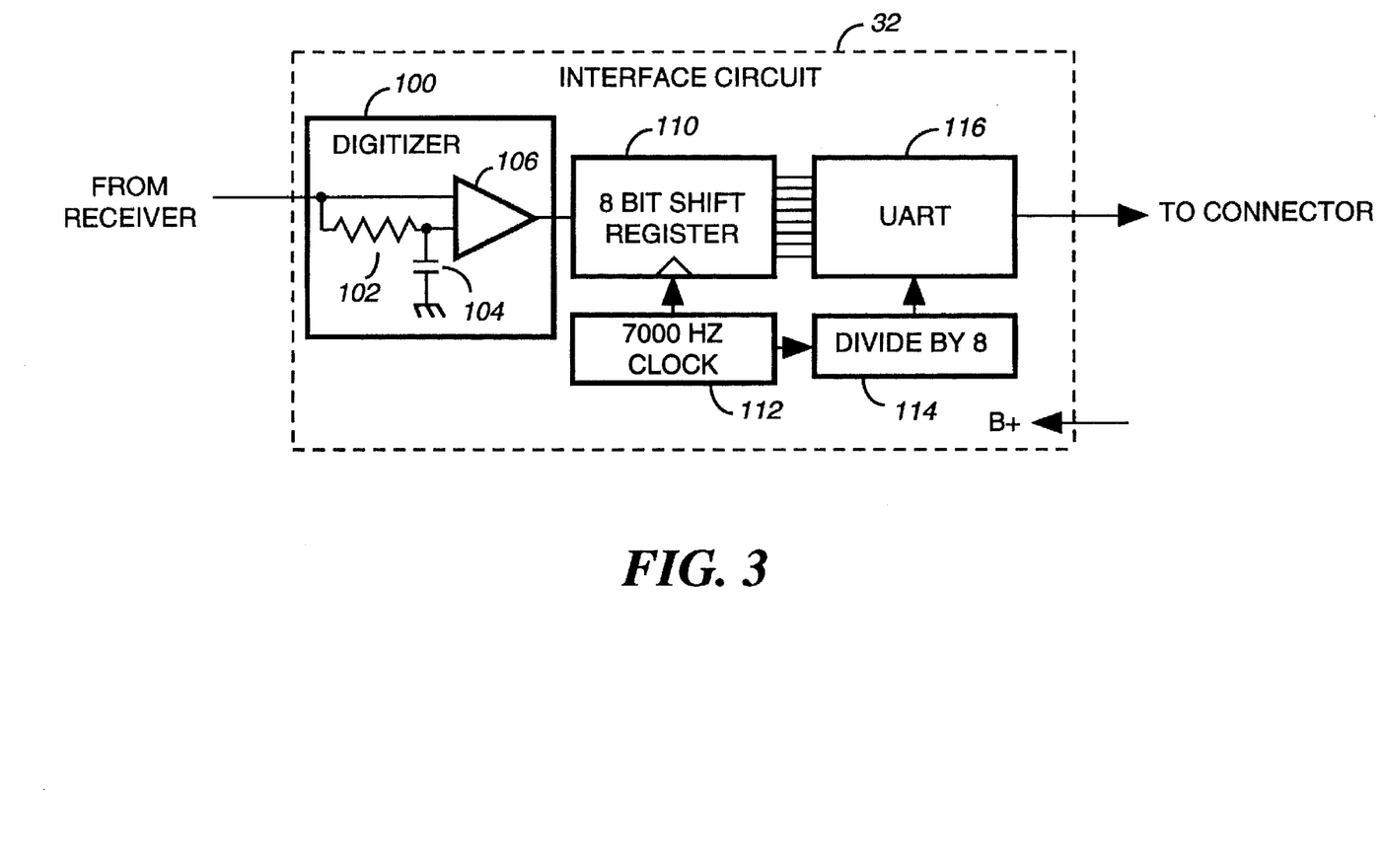
FIG. 3 shows a first preferred embodiment of elements included in the interface circuit of FIG. 2.

FIG. 3 shows a first preferred embodiment of elements included in the interface circuit 32. The receiver 30 performs the task of RF reception and demodulation, producing a recovered audio signal for a digitizer 100. A resistor 102 and a capacitor 104 establish a DC voltage, proportional to the carrier offset, which is used by a comparator 106 to both extract the carrier offset and digitize the demodulated signal. An eight bit shift register 110 shifts in the output of the comparator 106 in accordance with a clock 112 which in this embodiment is preferably set to 7000 Hz. Post detection filtering of the audio signal is set correspondingly. The 7000 Hz clock rate is not synchronously related to the POCSAG data rate and it will be appreciated that the clock rate is selected to provide adequate sampling of the digitized signal by software instructions operating within the PC 50. After eight samples are taken, a divider 114 signals a UART 116 to transmit the eight samples. The UART 116 adds appropriate start and stop bits. In this embodiment a minimum standard baud rate between the accessory 20 and the PC 50 is 9600 bits per second.

Figure 4:
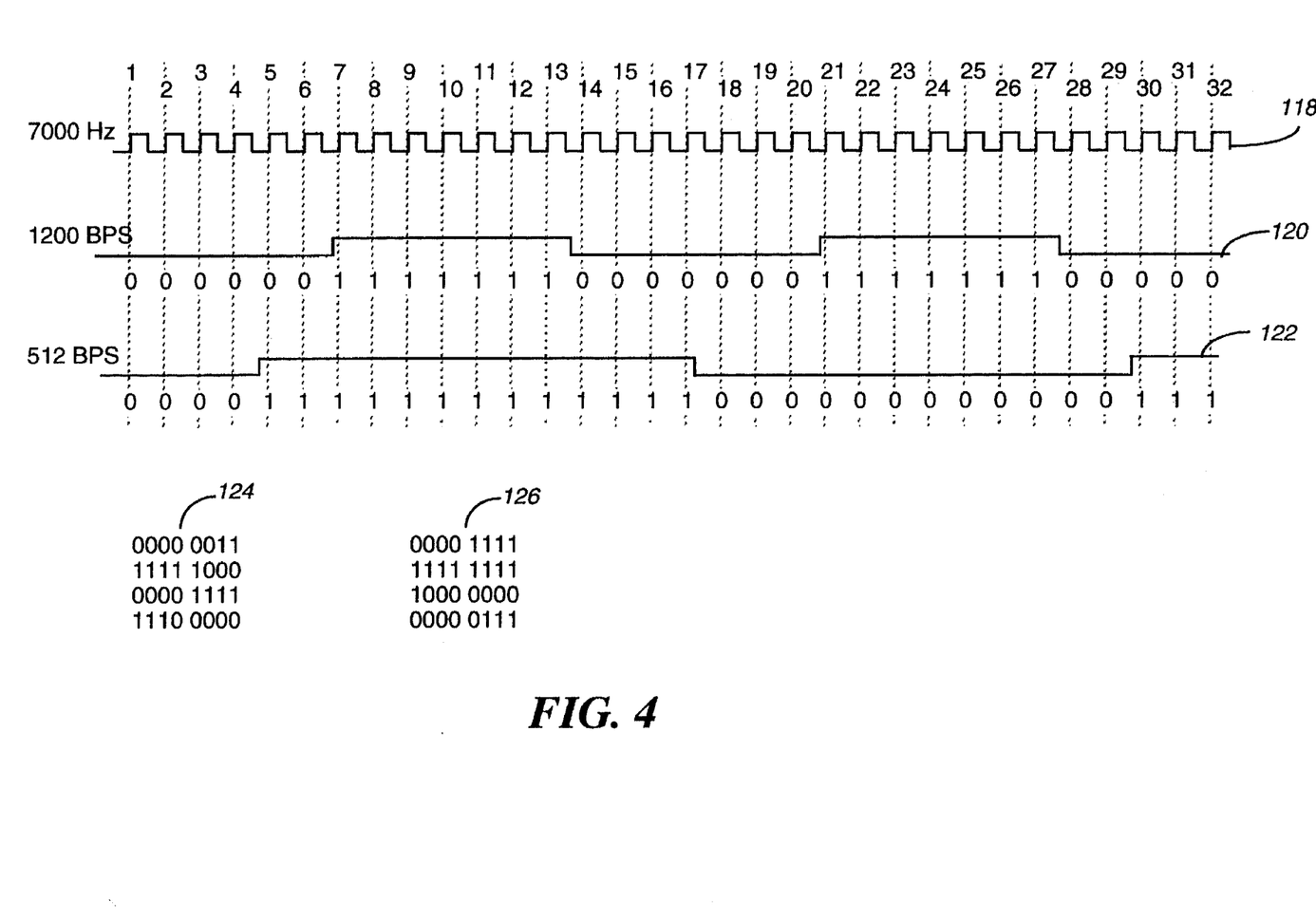
FIG. 4 illustrates the operation of the circuit of FIG. 3 at various paging signal baud rates.

FIG. 4 illustrates the operation of the circuit of FIG. 3 and is used to describe how the PC 50 processes one of two different baud rates based upon software operating within the PC 50. In the preferred embodiment of the present invention, PC 50 uses software to synchronize to data received by the accessory 20 at one of several different baud rates without changes to the accessory 20. Wave form 118 represents the signal he output of the clock 112. Samples numbered 1 to 32, are taken by the eight bit shift register 110 on the rising edge of the 7000 Hz clock. Wave form 120 and wave form 122 represent a 1200 bps signal and a 512 bps signal, respectively, which have been digitized and which are produced by the digitizer 100 upon reception thereof. This would correspond to a POCSAG signal received at either a 1200 bps signal or a 512 bps signal. Pattern 124 and pattern 126 each represent four bytes of asynchronously sampled data sent from the accessory 20 to the PC 50 for processing while receiving either the 1200 bps signal or the 512 bps signal.

When the 1200 bps signal is being received, pattern 124 will be communicated to the PC 50, which preferably loads the pattern into a buffer and processes the pattern as a background task, utilizing processing cycles otherwise wasted by the microcomputer 65. The microcomputer 65 executes instructions from the internal memory 70 and / or the instruction memory 40 or 84, which instruct the microcomputer 65 on how to process information from the accessory 20. For the PC 50 to perform the bit synchronization task, the boundaries and center of a bit must be determined. Given software instructions programmed to process information received at a baud rate of 1200 bps and given the predetermined asynchronously sample rate of 7000 Hz, the software instructions are programmed to recognize a bit or symbol as occurring about every 5.83 samples. By inspection, transitions between bits occur at samples 6 and 7, 13 and 14, 20 and 21, and 27 and 28. Consequently, the software instructions executing in the PC 50 and programmed to process the 1200 bps data would determine the center of each bit to be around samples 8–10, 15–17, and 23–25, and occurring every 5.83 samples thereafter, thereby synchronizing to the asynchronously data stream digitized by the accessory 20. This method analyzes several samples around the center of the bit to improve performance in high noise environments, where the final bit state corresponds to the state of a majority of samples analyzed around the center of the bit. It will be appreciated that when a more optimum sampling method is developed, it can be implemented by a software upgrade to instructions executed by the PC 50. Other methods of bit synchronization and sampling well known to one of ordinary skill in the art can be used in the alternative.

Similarly, a different set of software instructions can be loaded allowing processing of wave form 122 occurring at 512 bps. Upon reception of wave form 122, pattern 126 would be communicated to a buffer in the PC 50. Given software instructions programmed to process information received at a baud rate of 512 bps and given the predetermined sample rate of 7000 Hz, the software instructions would recognize a bit or symbol as occurring about every 13.67 samples. By inspection, transitions between bits occur at samples 4 and 5, 16 and 17, and 29 and 30. Consequently, the software instructions programmed to process the 512 bps data would determine the center of each bit to be around samples 7–15, and 20–27, and occurring every 13.67 samples thereafter, thereby synchronizing to the asynchronous data stream digitized by the accessory 20. Thus, by changing the software, the PC 50 can be adapted to process information at different baud rates without a change to the accessory. Upon determining the boundaries of each bit, and processing each bit, the tasks of frame and batch synchronization, message selection, message processing and storage, and message presentation can be also performed by software instructions from either the instruction memory 40 or the disk memory 84 in a manner well known to one of ordinary skill in the art.

In summary, the accessory 20 can be first provided to a user having original instructions stored on the instruction memory 40 located within the housing 22 for decoding a predetermined signaling protocol, such as 512 bps POCSAG. The user, then wishing to upgrade to a modification of the predetermined signaling protocol, such as 1200 bps POCSAG, would secure additional instructions stored on the disk memory 84, a media not located within the housing 22. The additional instructions would cause the PC 50 to decode the digital symbols in accordance with 1200 bps POCSAG. Thus, the user has the advantage of upgrading system without the expense of acquiring additional hardware.

Figure 5:
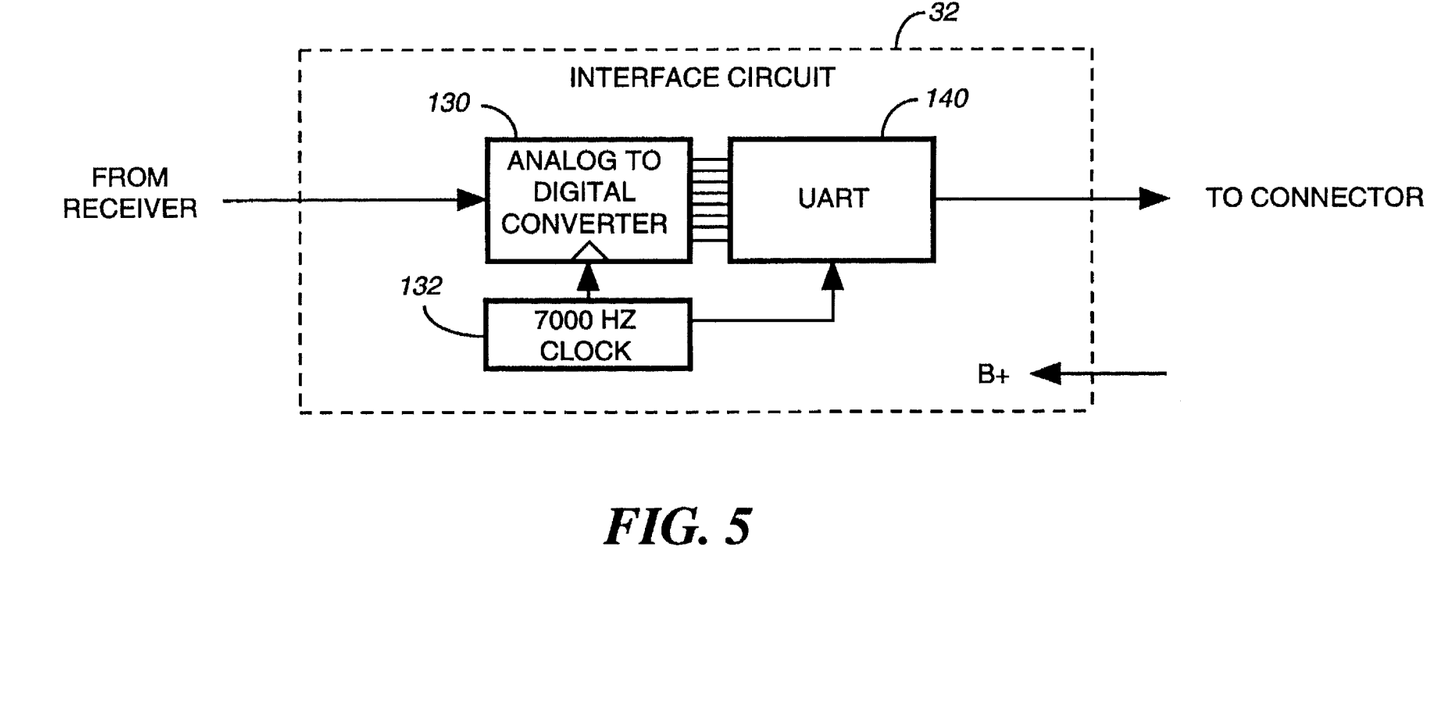
FIG. 5 shows a second embodiment of elements included in interface circuit of FIG. 2.

FIG. 5 shows a second embodiment of elements included in the interface circuit 32. An analog to digital converter, which is by way of example an 8-bit DAC 130, performs the task of digitizing the recovered audio signal from the receiver 30. The 8-bit DAC 130 is asynchronously clocked by a 7000 Hz clock such as described above, and the 8-bit DAC 130 output is fed to a UART 140 which appends start and stop bits. In this embodiment, the minimum conventional UART rate is 76,800 baud and the information is stored in a buffer for background processing by the microprocessor 65. The values communicated by the 8-bit DAC 130 include a digital representation of the carrier or DC offset voltage as well as the demodulated signal. The DC offset voltage can be extracted by software instructions by determining the maximum and minimum voltages of the information in the buffer to determine an average voltage, and then comparing each 8-bit DAC sample with the average voltage to produce a binary result: a one if greater or a zero if less than the average voltage. In this manner, the software instructions in the PC 50 perform the task of carrier or DC offset voltage extraction. Thereafter, the binary information is processed similar to the description of FIG. 4.

In summary, the receiver 30 produces an analog signal containing the demodulated symbols, the demodulated symbols occurring at the predetermined symbol rate for the POCSAG protocol at either 512 or 1200 bps. The interface circuit 32 includes an analog to digital converter, 100 and 110 or 130, which samples the demodulated symbols at a predetermined rate, such as at 7000 Hz, which is asynchronous to and greater than the predetermined symbol rate. An asynchronous data stream, 124 or 126, representing the digitized symbols is produced. Furthermore, instructions within the instruction memory 40 and / or 84 for the PC 50 cause it to synchronize to the asynchronous data stream in order to recover and to decode the digital symbols in accordance with the POCSAG protocol, and to further recover the message information.

Placing the DC offset extraction task of the second embodiment of the accessory 20 operating in the PC software has the advantage of upgrading the accessory 20 / PC 50 system to other protocols which use multi-level modulation without requiring changes to the accessory 20. For example, processing of a 512 bps or 1200 bps 2-level FM signal has been described with respect to FIGS. 4 and 5. However, the system of FIG. 5 can further be programmed to decode a 6400 bps Flex™ encoded signal with only a software change and no hardware changes to accessory 20 or PC 50. Software instructions cause processing of 3200 baud Flex™ symbols from the accessory by determining three thresholds equally spaced between the aforementioned minimum and maximum values and creating four voltage domains having two equivalent bits per domain. Then the software instructions cause the assignment of two bits to each DAC sample corresponding to one of the four voltage domains, thereby producing a binary bit stream. Such a process is well known to one of ordinary skill in the art of digitizing multi-level symbols.

Furthermore, the POCSAG synchronization and message processing task software instructions can be replaced with software instructions adapted for synchronizing and message processing tasks of the Flex™ paging protocol. For example, POCSAG message processing instructions can be included in the instruction memory 40 within the accessory 20. When the Flex™ paging protocol becomes available on the system, the accessory 20 / PC 50 system can be upgraded to receive and process Flex™ messages with additional instructions provided on a computer disk, without any modification to the accessory 20.

In summary, the accessory 20 would be first provided to a user having instructions stored in the instruction memory 40 within the housing 22 for decoding a predetermined signaling protocol, such as 512 bps POCSAG. The user, then wishing to upgrade to a second predetermined signaling protocol, such as Flex™, would secure additional instructions stored on the disk memory 84, a media not located within the housing. The additional instructions would cause the PC 50 to decode the digital symbols in accordance with the Flex™ protocol. Thus, the user has the advantage of upgrading the operating system from the POCSAG to the Flex™ protocol without the expense of acquiring additional hardware.

Figure 6:
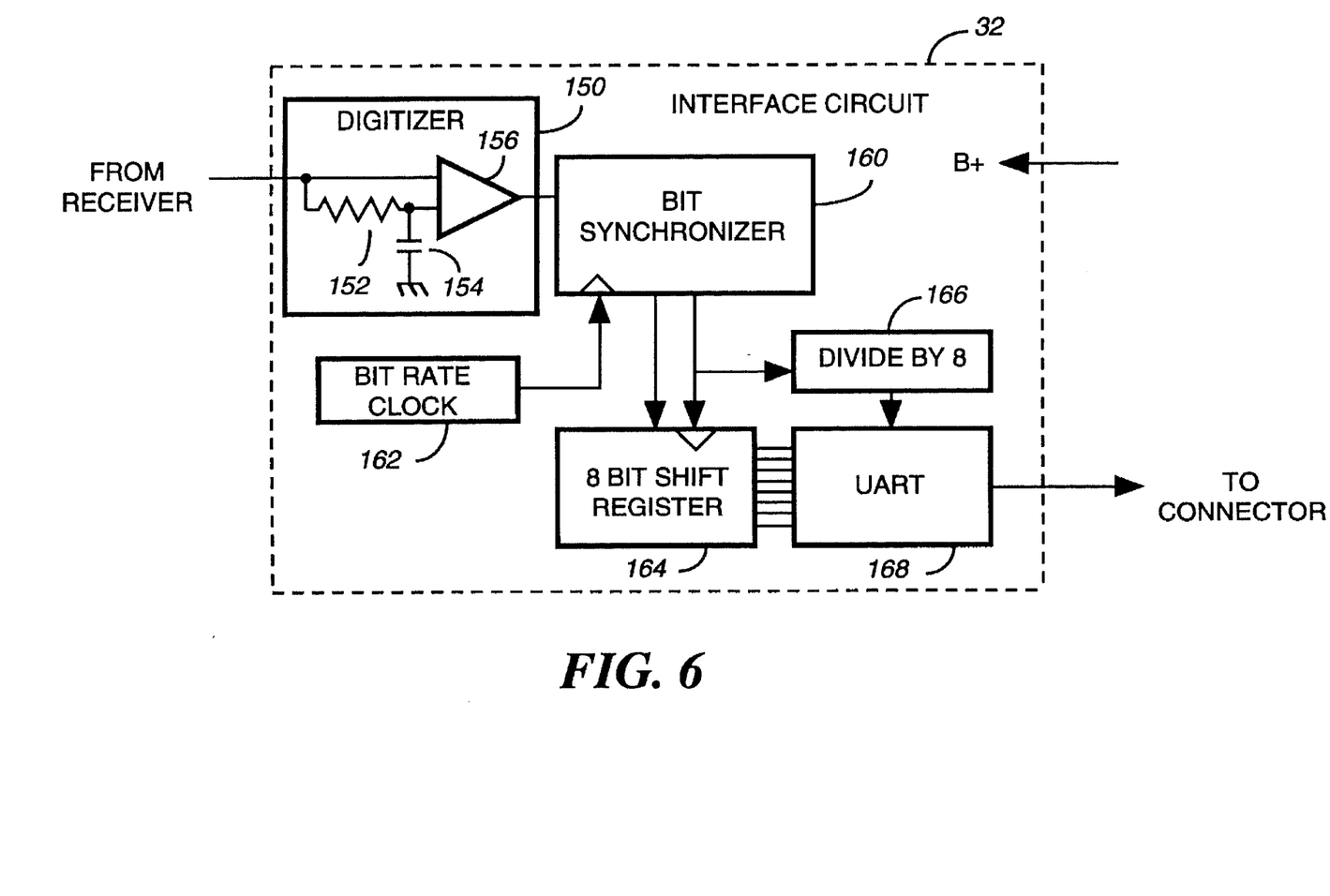
FIG. 6 shows a third embodiment of elements included in interface circuit of FIG. 2.

FIG. 6 shows a third embodiment of elements included in the interface circuit 32. In this embodiment, a digitizer 150 operates similar to the digitizer 100 of FIG. 3, with a resistor 152, a capacitor 154 and a comparator 156 corresponding to resistor 102, a capacitor 104 and a comparator 106 respectively. A bit synchronizer 160 performs the task of bit synchronization by a hardware circuit clocked by a bit rate clock 162 having a frequency which is an integer (??) multiple of the desired baud rate. The bit synchronizer 160 enables an eight bit shift register 164 to take one sample per bit substantially in the center of each bit in a manner well known to one of ordinary skill in the art. After eight bit times, a divide by eight circuit 166 causes UART 168 to communicate the sampled bits to the PC 50 with appropriate start and stop bits. Since the bit synchronization task is performed in the accessory 20, this embodiment of the present invention has the advantage of reducing the UART baud rate. For example, 512 bps and 1200 bps paging signals can be communicated at standard UART rates of 1200 and 2400 baud respectively. Further, since the PC 50 processes only one sample per received bit, the size of the buffer and the amount of background processing required by the PC 50 is reduced, thereby requiring less of the resources of the PC 50.

In summary, the interface circuit 32 comprises a bit synchronizer 160 which provides a sampling means for synchronously sampling the demodulated symbols to produce a data stream corresponding to information within the digitized symbols, and software instructions for the PC 50 cause it to decode the data stream in accordance with the POCSAG protocol, and to recover the message information.

Figure 7:
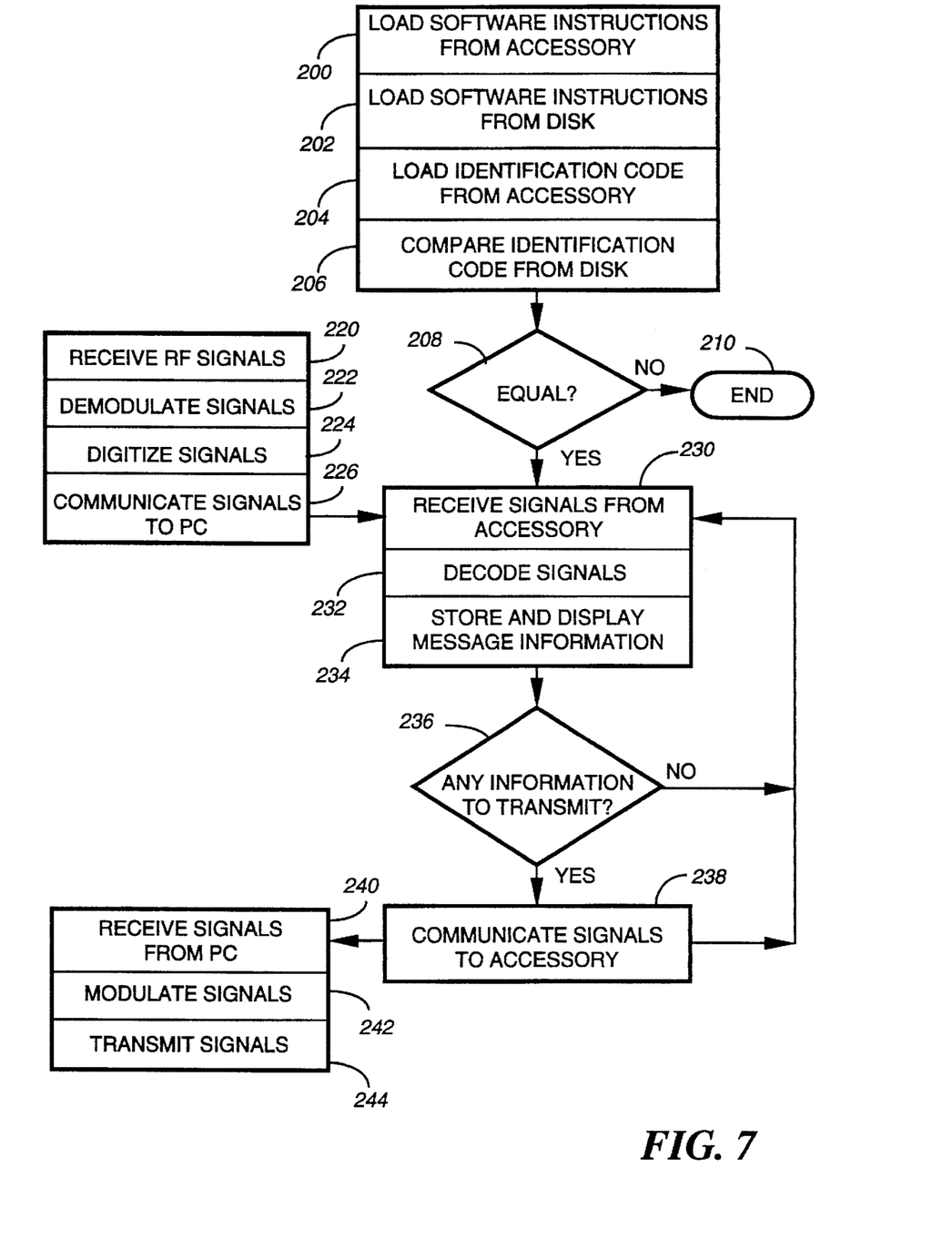
FIG. 7 shows a flow chart of an accessory / PC system operating in accordance with the present invention.

FIG. 7 shows a flow chart of the accessory 20 / PC 50 system operating in accordance with the present invention. At step 200, a first portion of the software instructions are loaded from the instruction memory 40, a first storage media located within the housing 22. Then at step 202, a second portion of the software instructions are loaded from the disk memory 84, a second storage media not located within the housing 22. The disk software instructions may complement, modify or replace the accessory software instructions. In alternate embodiments, the software instructions can reside totally on either the accessory 20 or the disk memory 84, thereby eliminating the need for either disk memory 84 or the instruction memory 40 respectively.

The present invention has the ability to complement or modify instructions stored in the accessory 20 with those stored in the disk memory 84. For example, the accessory 20 can be provided with instructions for maintaining a New York Stock Exchange data base in the PC 50. The user may later desire to add an index calculation to the New York Stock Exchange data base. This can be added by instructions on the disk memory 84. In other words, instructions from the accessory 20 cause PC 50 to manage message information within the digital computing device, and additional instructions stored on the disk memory 84, a media not located within the housing, cause the PC 50 to modify the management of the message information within the PC 50.

In step 204, the identification code uniquely assigned to the accessory 20 is read from the identification code memory 42. Then step 206 compares the identification code of the accessory 20 against an identification code stored on the disk memory 84. If they are not equal, then step 208 ends the program or at least inhibits execution of certain unauthorized routines by executing step 210. This prevents the unauthorized reception of message information. For example, a first user could purchase software on disk memory 84 upgrading the kind of information received by the accessory 20 PC 50 system. Without the use of the identification code of steps 204-210, then the first user could give the disk to a second user having a similar accessory / PC system and upgrade the system free of charge. This is prevented by requiring the software instructions on the disk 84 to have an identification code matching the unique identification code of the accessory 20. It will be appreciated that steps 204-210 can be eliminated at the expense of possibly loosing control of the protection provided for unauthorized usage of the accessory 20.

In summary, the accessory 20 includes a first storage media, identification code memory 42, located within the housing 22 for storing a unique code therein, wherein the software instructions further comprise a means for verifying the unique code, steps 204 to 208, and wherein the software instructions will become at least partially inoperative in response to an absence of verification of the unique code at step 210.

Steps 220, 222, 224 and 226 are performed by circuitry in the accessory 20 which receives, demodulates, digitizes and communicates, respectively, the paging signals to the PC 50 as previously described. In step 230, the PC 50 receives the signals and decodes them in step 232 as previously described. Then the decoded message information is stored and displayed in accordance with instructions from the accessory 20 and/or the disk memory 84.

Step 236 determines if there is any information to transmit. The present invention so far has been described with respect to one-way paging protocols such as POCSAG and Flex™. However two-way digital wireless communication systems such as Motorola's ReFlex™ paging protocol are being introduced into the paging market. Such systems use a transmitter 28 to originate messages or reply to received messages. One embodiment of the present invention realizes such a protocol with the accessory 20 / PC 50 system. When information is to be transmitted, then step 238 communicates the information from the PC 50 to the accessory 20. Then, the accessory 20 receives, modulates and transmits the signals at steps 240, 242 and 244 respectively. In this alternate embodiment of the present invention, information from the PC 50 is received by the accessory 20 having a UART which buffers the information in parallel. The parallel information is serially clocked from a shift register at a predetermined frequency of 7000 Hz for example. Then any necessary shaping is performed before the information is transmitted.

In summary, the interface circuit 32 receives digitized transmit signals through the connector 35 and 55 from the PC 50 and generates a transmittable signal therefrom. The transmitter 28 transmits a second radio frequency signal having the transmittable data modulated thereon.

In an alternate embodiment of the invention, both the receive and transmit frequencies of the receiver 30 and the transmitter 28 can be programmed by software instructions operating within the PC 50. This will allow software to upgrade the operation of the accessory 20 / PC 50 system to follow changes in the state of the art in wireless communication. For example, the receiver 30 and the transmitter 28 can be programmed to operate with a digital packet version of a cellular communication system, or a code division multiple access transmit channel with a conventional narrow band paging receiver channel.

Thus, what has been described above is an accessory to a personal computing device which realizes the ability to receive and transmit wireless information at a significantly reduced material cost while providing significantly improved flexibility in upgrading the performance of the system, and further provides security to provide unauthorized use of the accessory 20.

We claim:

1. A radio accessory for a digital computing device, the radio accessory comprising:

a housing;

a radio frequency receiver located within said housing for receiving a radio frequency signal comprising modulated symbols organized in accordance with a predetermined signaling protocol for communicating message information;

said radio frequency receiver further for demodulating the modulated symbols for generating demodulated symbols organized in accordance with the predetermined signaling protocol;

an interface circuit located within said housing and coupled to said radio frequency receiver for digitizing the demodulated symbols thereby producing digitized symbols organized in accordance with the predetermined signaling protocol;

a connector affixed to said housing for removably coupling the radio accessory to a corresponding connector affixed to the digital computing device, said connector for communicating the digitized symbols to the digital computing device for processing by the digital computing device in accordance with the predetermined signaling protocol to recover the message information;

a first storage media located within said housing of the radio accessory for storing instructions for the digital computing device, said instructions controlling processing by the digital computing device to decode the digitized symbols in accordance with the predetermined signaling protocol to recover the message information; and a second storage media not located within said housing, for storing additional instructions controlling processing by the digital computing device to decode the digitized symbols in accordance with a modification of the predetermined signaling protocol.

2. A radio accessory for a digital computing device, the radio accessory comprising:

a housing;

a radio frequency receiver located within said housing for receiving a radio frequency signal comprising modulated symbols organized in accordance with a predetermined signaling protocol for communicating message information;

said radio frequency receiver further for demodulating the modulated symbols for generating demodulated symbols organized in accordance with the predetermined signaling protocol;

an interface circuit located within said housing and coupled to said radio frequency receiver for digitizing the demodulated symbols thereby producing digitized symbols organized in accordance with the predetermined signaling protocol;

a connector affixed to said housing for removably coupling the radio accessory to a corresponding connector affixed to the digital computing device, said connector for communicating the digitized symbols to the digital computing device for processing by the digital computing device in accordance with the predetermined signaling protocol to recover the message information;

a first storage media located within said housing of the radio accessory for storing instructions for the digital computing device, said instructions controlling processing by the digital computing device to decode the digitized symbols in accordance with the predetermined signaling protocol to recover the message information, wherein additional digitized symbols are organized in accordance with a second predetermined signaling protocol in order to communicate the message information; and a second storage media not located within said housing, for storing additional instructions for controlling processing of the digital computing device to decode the additional digitized symbols in accordance with the second predetermined signaling protocol.

3. A radio accessory for a digital computing device, the radio accessory comprising:

a housing;

a radio frequency receiver located within said housing for receiving a radio frequency signal comprising modulated symbols organized in accordance with a predetermined signaling protocol for communicating message information;

said radio frequency receiver further for demodulating the modulated symbols for generating demodulated symbols organized in accordance with the predetermined signaling protocol;

an interface circuit located within said housing and coupled to said radio frequency receiver for digitizing the demodulated symbols thereby producing digitized symbols organized in accordance with the predetermined signaling protocol;

a connector affixed to said housing for removably coupling the radio accessory to a corresponding connector affixed to the digital computing device, said connector for communicating the digitized symbols to the digital computing device for processing by the digital computing device in accordance with the predetermined signaling protocol to recover the message information;

a first storage media located within said housing of the radio accessory for storing instructions for the digital computing device, said instructions controlling processing by the digital computing device to decode the digitized symbols in accordance with the predetermined signaling protocol to recover the message information, said instructions further control processing by the digital computing device to manage the message information within the digital computing device; and a second storage media not located within said housing for storing additional instructions for controlling the processing by the digital computing device to modify management of the message information within the digital computing device.

4. A radio accessory for a digital computing device, the radio accessory comprising:

a housing;

a radio frequency receiver located within said housing for receiving a radio frequency signal comprising modulated symbols organized in accordance with a predetermined signaling protocol for communicating message information;

said radio frequency receiver further for demodulating the modulated symbols for generating demodulated symbols organized in accordance with the predetermined signaling protocol;

an interface circuit located within said housing and coupled to said radio frequency receiver for digitizing the demodulated symbols thereby producing digitized symbols organized in accordance with the predetermined signaling protocol;

a connector affixed to said housing for removably coupling the radio accessory to a corresponding connector affixed to the digital computing device, said connector for communicating the digitized symbols to the digital computing device for processing by the digital computing device in accordance with the predetermined signaling protocol to recover the message information;

a first storage media located within said housing for storing a first portion of instructions for controlling processing by the digital computing device to decode the digitized symbols in accordance with the predetermined signaling protocol to recover the message information; and a second storage media not located within said housing for storing a second portion of instructions for controlling processing by the digital computing device to decode the digitized symbols in accordance with a second predetermined signaling protocol to recover the message information.

5. The radio accessory according to claim 4, wherein the first storage media further stores a unique code; and the second storage media further stores instructions for verifying the unique code.

* * * * *